United States Patent [19]

Yamamura et al.

[11] Patent Number: 5,154,832
[45] Date of Patent: Oct. 13, 1992

[54] SPIRAL WOUND GAS PERMEABLE MEMBRANE MODULE AND APPARATUS AND METHOD FOR USING THE SAME

[75] Inventors: Hiroyuki Yamamura, Otsu; Hiroyuki Ikada, Urayasu; Yukuo Toyoda, Otsu; Kazuhiko Nishimura, Youkaichi; Kazuo Imai, Moriyama, all of Japan

[73] Assignee: Toray Industries, Inc., Tokyo, Japan

[21] Appl. No.: 660,443

[22] Filed: Feb. 26, 1991

[30] Foreign Application Priority Data

Feb. 27, 1990 [JP] Japan .................. 2-48757
Oct. 18, 1990 [JP] Japan .................. 2-280665

[51] Int. Cl.⁵ ............................ B01D 63/10
[52] U.S. Cl. .......................... 210/640; 210/247; 210/321.74; 210/321.83
[58] Field of Search .......... 210/336, 436, 180, 321.74, 210/321.83, 494.1, 486, 247, 497.1, 640; 55/16, 158

[56] References Cited

U.S. PATENT DOCUMENTS

| | | |
|---|---|---|
| 3,892,533 | 7/1975 | Freedman et al. ............ 55/158 X |
| 4,033,878 | 7/1977 | Foreman et al. ............ 210/336 X |
| 4,268,279 | 5/1981 | Shindo et al. ............ 210/500.23 X |

FOREIGN PATENT DOCUMENTS

| | | |
|---|---|---|
| 0088459 | 9/1983 | European Pat. Off. . |
| 0096340 | 12/1983 | European Pat. Off. . |
| 0208883 | 1/1987 | European Pat. Off. . |
| 0356177 | 2/1990 | European Pat. Off. . |
| 44-14216 | 6/1969 | Japan . |
| 54-31037 | 7/1979 | Japan . |
| 56-129006 | 10/1981 | Japan . |
| 57-35795 | 2/1982 | Japan . |
| 58-14905 | 1/1983 | Japan . |
| 58-101784 | 6/1983 | Japan . |
| 58-186490 | 10/1983 | Japan . |
| 62-57630 | 3/1987 | Japan . |
| 62-273095 | 11/1987 | Japan . |
| 22802 | 1/1990 | Japan . |
| 225096 | 2/1990 | Japan . |

*Primary Examiner*—Frank Spear
*Attorney, Agent, or Firm*—Birch, Stewart, Kolasch & Birch

[57] ABSTRACT

A spiral wound gas permeable membrane module having a hollow mandrel with a plurality of holes, at least one envelope-like gas permeable membrane wrapped spirally around the mandrel, at least one feed water spacer positioned on the outer surfaces of the spirally wrapped envelope-like membrane, and at least one permeation side spacer provided in the envelope-like membrane. The module contains a partition block for blocking the flow of a gas flowing in the mandrel in its longitudinal direction and a flow regulating wall directing the flow of the gas introduced into the envelope-like membrane through the holes aligned on one side of the partition block so that the gas travels in the envelope-like membrane in a spirally outer direction, then returns in a spiral inner direction and flows into the mandrel through the holes aligned on the other side of the partition block. The gas dissolved in raw water supplied to the feed water spacer side is degasified by gas permeation to the permeation side spacer through the membrane which has a broad area for permeation with a high efficiency.

23 Claims, 7 Drawing Sheets

SPIRAL WOUND GAS PERMEABLE MEMBRANE MODULE AND APPARATUS AND METHOD FOR USING THE SAME

BACKGROUND OF THE INVENTION

1. Field of the Invention

The present invention relates to a spiral wound gas permeable membrane module using a hydrophobic gas permeable membrane and an apparatus and a method for using the same.

2. Description of the Prior Art

Generally, gases such as oxygen, nitrogen and carbon dioxide are dissolved in a water, and sometimes these dissolved gases give a bad influence to a water treatment. For example, oxygen dissolved in a water often accelerates the corrosion of the inner surface of a pipe wetted by the water in a water circulation system, and carbon dioxide dissolved in a water often deteriorates the water quality of a super pure water produced by a water purifying system. In such cases, degasification treatment has been performed as required by, for example, addition of chemical or vacuum treatment as disclosed in, for instance, JP-A-SHO 58-14905, SHO 58-101784 and SHO 58-186490.

In the conventional degasification by such a chemical treatment, however, there are problems such as the cost of chemical and residual components Also there are restrictions such as the cost of the system and the running cost even in the vacuum treatment. Therefore, these conventional treatments have not truly served for a desired practical degasification.

On the other hand, recently a method for degasifying dissolved gases from a raw water by using a hydrophobic membrane having a gas permeation property has been developed for practical use (for example, Japanese Utility Model Laid-Open SHO 57-35795, JP-A-SHO 62-273095). In this method, a raw water flows on the surface or back surface of a membrane having a gas permeation property and a hydrophobic property, the other surface side being controlled to the condition of a reduced pressure, and thereby only the gas dissolved in the raw water is permeated through the membrane and removed from the raw water. This method has the advantages that there is no residual chemical left which is the problem in the conventional chemical addition method and that the apparatus or system for this method is simple and the running cost thereof is inexpensive as compared with the conventional vacuum degasification method.

In degasification using a hydrophobic gas permeable membrane, the membrane forms a unit of a module. As the types of such gas permeable membrane modules, the spiral type and the hollow yarn type are well known, depending upon the formation of the membrane (for example, JP-A-HEI 2-2802, Japanese Utility Model Laid-Open HEI 2-25096). In a case where the amount of gas to be degasified is large, it is considered that a spiral type module using a plane gas permeable membrane is good. A typical conventional spiral module is constructed, for example, as shown in FIG. 10. The spiral module shown in FIG. 10 basically has the same structure as those disclosed in JP-B-SHO 44-14216, JP-A-SHO 54-31087 and JP-A-SHO 56-129006 which are used for the separation of liquids In FIG. 10, the unit comprises an envelope-like hydrophobic gas permeable membrane 105 sealed at both of its side edges 102, a permeation side spacer 106 provided in the envelope-like membrane and a feed water spacer 104 on the outer surface of the envelope-like membrane, and one or a plurality of the units are wrapped around a hollow mandrel 101 which has a plurality of holes on its surface and whose one end is plugged and the other end 101a is opened. Raw water 107 is supplied to the outer surface side of envelope-like membrane 105, and the gas pressure in the envelope-like membrane is reduced by the suction by a pressure reducing source connected to opening end 101a of hollow mandrel 101 to cause a pressure difference between the surface and the back surface of hydrophobic gas permeable membrane 105. The gas dissolved in raw water 107 permeates from the surface of envelope-like membrane 105 to its back surface, and the permeated gas 103 flows along the passageway of permeation side spacer 106 in the envelope-like membrane towards the hollow mandrel 101. Thus, the dissolved gas is removed from the raw water 107.

In such a degasification, however, since the degasification ability greatly depends on the difference between the partial gas pressures of the surface side and back surface side of the membrane as well as on the specific gas permeation property of the membrane itself, it is necessary to reduce the partial gas pressure of the gas permeation side by elevating the degree of vacuum on the gas permeation side of the membrane, or to increase the supply pressure of the raw water supplied to the module, i.e., to the surface side of the membrane, in order to increase the degasification ability of the module. However, the degree of vacuum of the gas permeation side and the supply pressure of the raw water are both limited to certain levels from the viewpoint of practical use, therefore it is difficult to further increase the degasification ability.

SUMMARY OF THE INVENTION

Accordingly, an object of the present invention is to provide a spiral wound gas permeable membrane module having a sufficiently high degasification ability even at a usual degree of vacuum on the gas permeation side of the membrane or a usual supply pressure of a raw liquid supplied to the module.

Another object of the present invention is to provide an apparatus using such a spiral wound gas permeable membrane module for degasifying a gas from a raw liquid or charging a gas into a liquid with a high efficiency.

A further object of the present invention is to provide methods for using the spiral wound gas permeable membrane module to degasify a gas from a raw liquid or charge a gas into a liquid with a high efficiency.

To achieve these objects, a spiral wound gas permeable membrane module according to the present invention is herein provided. The spiral wound gas permeable membrane module has a hollow mandrel with a plurality of longitudinally aligned holes, at least one envelope-like gas permeable membrane connected to the side surface of the mandrel at the opening side end of the envelope-like gas permeable membrane to communicate the interior of the mandrel with the interior of the envelope-like gas permeable membrane through the holes and spirally wrapped around the mandrel, at least one feed water spacer spirally wrapped around the mandrel so that the feed water spacer is positioned on the outer surfaces of the spirally wrapped envelope-like gas permeable membrane, and at least one permeation side spacer provided in the envelope-like gas permeable membrane. The spiral wound gas permeable membrane module comprises means provided in the mandrel for substantially blocking the flow of a gas flowing in the mandrel in its longitudinal direction and means provided in the envelope-like gas permeable membrane for regulating the flow of the gas flown into the envelope-like gas permeable membrane through the holes aligned on one side relative to the flow blocking means so that the gas travels in the envelope-like gas permeable membrane in a spiral outer direction and then backs in the spiral inner direction and flows into the mandrel through the holes aligned on the other side relative to the flow blocking means.

An apparatus for degasification according to the present invention includes at least one above spiral wound gas permeable membrane module, and comprises means for supplying a raw liquid to the passageway of the feed water spacer of the module and means for supplying a carrier gas to one of the end openings of the mandrel of the module.

The apparatus for charging a gas into a liquid according to the present invention includes at least one above spiral wound gas permeable membrane module, and comprises means for supplying the liquid to the passageway of the feed water spacer of the module and means for supplying the gas to be charged to one of the end openings of the mandrel of the module.

The method for using at least one of the above spiral wound gas permeable membrane modules, according to the present invention, comprises the steps of supplying a raw liquid to the passageway of the feed water spacer so that the raw liquid flows on and along the outer surfaces of the spirally wrapped envelope-like gas permeable membrane; and supplying a carrier gas substantially other than a gas to be degasified from the raw liquid to one of the end openings of the mandrel so that the carrier gas flows from the one end opening to the other end opening of the mandrel through the interior of the envelope-like gas permeable membrane and the holes aligned on both sides relative to the flow blocking means.

The method for using at least one of the above spiral wound gas permeable membrane module according to the present invention comprises the steps of supplying a liquid to the passageway of the feed water spacer so that the liquid flows on and along the outer surfaces of the spirally wrapped envelope-like gas permeable membrane; and supplying a gas to be charged into the liquid to one of the end openings of the mandrel so that the gas flows from the one end opening to the other end opening of the mandrel through the interior of the envelope-like gas permeable membrane and the holes aligned on both sides relative to the flow blocking means.

In the spiral wound gas permeable membrane module, a carrier gas substantially different from a gas to be degasified from a raw liquid is introduced into one of the end openings of the mandrel, the carrier gas flows from the inside of the mandrel into the interior of the envelope-like gas permeable membrane through the holes aligned on one side relative to the flow blocking means, the carrier gas flows in the envelope-like gas permeable membrane so as to travel in the spiral outer direction and then back in the spiral inner direction towards the mandrel by the regulation of the flow by the flow regulating means, and the carrier gas flows into the inside of the mandrel through the holes aligned on the other side relative to the flow blocking means and flows out from the other opening of the mandrel. The flow of the carrier gas in the envelope-like gas permeable membrane can purge the residual gas present in the membrane and the gas permeated through the membrane from the raw liquid, and the partial gas pressure of the gas to be degasified on the back surface side of the membrane can be extremely reduced, for example, to be nearly equal to zero. As a result, the difference between the partial gas pressures of the gas to be degasified on the surface side and the back surface side of the membrane becomes very great, and the degasification ability due to the gas permeable membrane can be greatly increased.

In the conventional module such as one shown in FIG. 10, most of the carrier gas passes through the inside of the mandrel from one end opening thereof directly to the other end opening thereof without flowing into the envelope-like gas permeable membrane. Therefore, the degasification ability due to the gas permeable membrane is relatively low.

Further, the spiral wound gas permeable membrane module according to the present invention can be used for charging a gas into a liquid as well as for degasification. In the charging, a gas to be charged is flown on the back surface side of the envelope-like gas permeable membrane and a liquid to be charged with the gas is flown on the surface side of the envelope-like gas permeable membrane. The gas pressure of the gas to be charged is desirably controlled to a relatively high pressure. Since the gas to be charged flows in the envelope-like gas permeable membrane in the spiral outer direction and backs in the spiral inner direction also in the gas charging operation, the gas is delivered broadly in the envelope-like gas permeable membrane and charged into the liquid through the membrane with a high efficiency.

BRIEF DESCRIPTION OF THE DRAWINGS

Some preferred exemplary embodiments of the invention will now be described with reference to the accompanying drawings, which are given by way of example only, and are not intended to limit the present invention.

DETAILED DESCRIPTION OF PREFERRED EMBODIMENTS OF THE INVENTION

Figure 3:
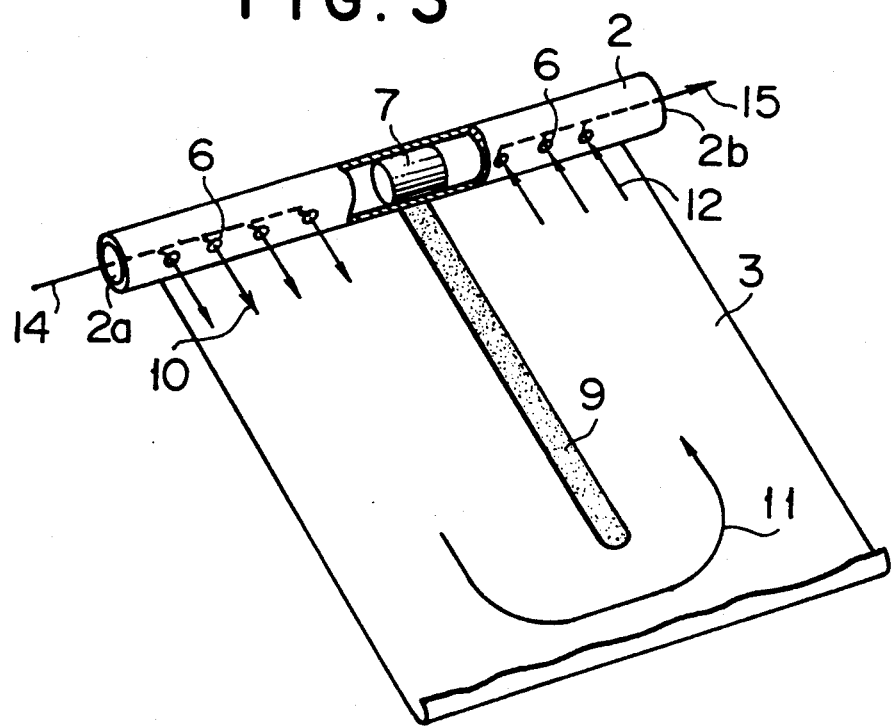
FIG. 3 is a perspective view of a part of the spiral wound gas permeable membrane module shown in FIG. 1.
Figure 4:
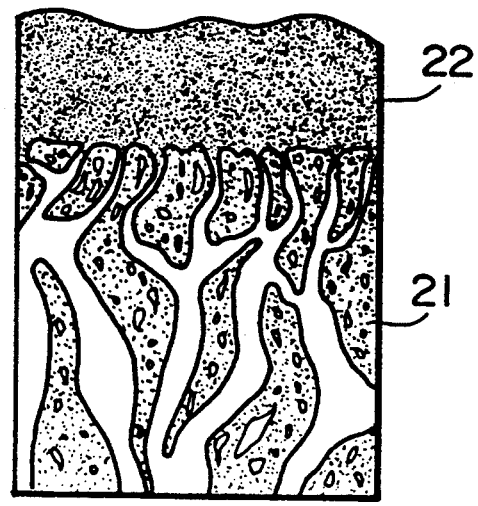
FIG. 4 is an enlarged partial sectional view of a membrane used in the spiral wound gas permeable membrane module shown in FIG. 1.
Figure 5:
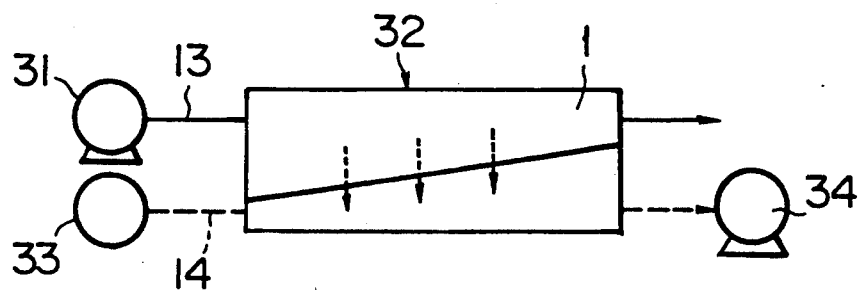
FIG. 5 is a block diagram of an apparatus using the spiral wound gas permeable membrane module shown in FIG. 1 for degasifying a gas from a liquid.

Referring to the drawings, FIGS. 1-4 illustrate a spiral wound gas permeable membrane module according to an embodiment of the present invention and FIG. 5 illustrates an apparatus using the spiral wound gas permeable membrane module.

A spiral wound gas permeable membrane module 1 has a hollow mandrel 2 at the radial central portion, at least one envelope-like gas permeable membrane 3 around the mandrel, at least one feed water spacer 4 around the mandrel and at least one permeation side spacer 5 in the envelope-like gas permeable membrane. The hollow mandrel 2 has a plurality of holes 6 (FIG. 3) on the surface which are aligned in the longitudinal direction of the mandrel. A partition block 7 is provided in hollow mandrel 2 at the longitudinally central position as means for substantially blocking the flow of a gas flowing in the mandrel in its longitudinal direction. A part of the plurality of holes 6 are positioned on one side relative to partition block 7 and the remaining holes 6 are positioned on the other side relative to the partition block. The hollow mandrel 2 is open at both of its ends 2a and 2b.

The envelope-like gas permeable membrane 3 is formed by turning a plane gas permeable membrane sheet and sealing both sides of the turned membrane sheet with an adhesive (sealed portion 8). The envelope-like gas permeable membrane 3 thus formed is connected to the side surface of mandrel 2 at the opening side end of the envelope-like gas permeable membrane to communicate the interior of the mandrel with the interior of the envelope-like gas permeable membrane through holes 6. The envelope-like gas permeable membrane 3 connected to mandrel 2 is spirally wrapped around the mandrel. A flow regulating or flow directing wall 9 is provided in envelope-like gas permeable membrane 3 as means for directing the flow of the gas in the envelope-like gas permeable membrane. Flow regulating wall 9 extends from the outer surface of mandrel substantially at the position of partition block 7 to an outer position in the envelope-like gas permeable membrane 3 so that both side portions of the flow regulating wall substantially do not directly communicate with each other. This flow regulating wall 9 regulates the flow of the gas introduced into the interior of envelope-like gas permeable membrane 3 through holes 6 aligned on one side relative to partition block 7 so that the gas travels in the envelope-like gas permeable membrane in a spiral outward direction and then back in the spiral inner direction and flows into mandrel 2 through the holes aligned on the other side of the partition block, as shown by arrows 10, 11 and 12 in FIGS. 1 and 3.

The feed water spacer 4 is provided on the outer surfaces of the spirally wrapped envelope-like gas permeable membrane 3 and wrapped together with the envelope-like gas permeable membrane. A raw liquid 13, for example, raw water is supplied to and flows along the passageway formed by feed water spacer 4 as shown by the arrows in FIG. 1. Permeation side spacer 5 is provided in the envelope-like gas permeable membrane 3 to form the passageway for a gas and is wrapped together with the envelope-like gas permeable membrane.

Figure 2:
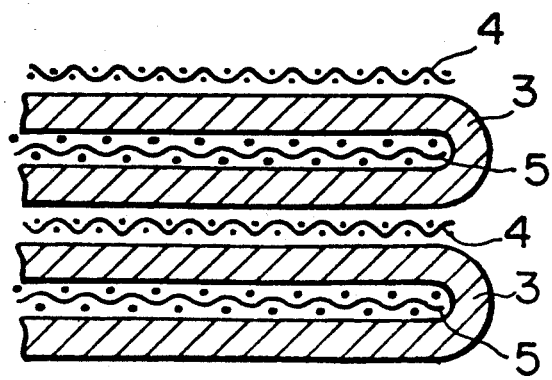
FIG. 2 is an enlarged partial sectional view of the spiral wound gas permeable membrane module shown in FIG. 1.

In the case of using a plurality of sets of envelope-like gas permeable membranes 3, feed water spacers 4 and permeation side spacers 5, these element are arranged alternately as shown in FIG. 2.

The kind of hydrophobic gas permeable membrane used as the envelope-like gas permeable membrane 3 of the above module 1 is not particularly restricted. The membrane may be a plane polymer membrane having a gas permeation property capable of separating a gas dissolved in a raw liquid from the raw liquid through the membrane.

The membrane is preferably composed of a polymer selected from the group consisting of silicone-based, fluorine-containing and polyolefine-based polymers. For example, the membrane comprises a supporting layer 21 consisting of a porous material formed from a polymer and a homogeneous or dense layer 22, as shown in FIG. 4. Where the homogeneous layer is a polymer material different from that of the porous supporting layer, the homogeneous layer is made separate from the porous supporting layer. A dense layer means a layer composed of the same polymer material as that of the porous supporting layer 21, and the dense layer is made together with the porous supporting layer in a single process.

The polymer suitable for the porous supporting layer is selected from, for example, the group consisting of a polyester, a polyamide, a polyolefine, polyacrylate, polymethacrylate, Teflon (polytetrafluorideethylene), silicone, a polysulfone and a polycarbonate. Particularly, polysulfone and polypropylene are preferable. Although the thickness of the porous supporting layer can be freely determined, the thickness is preferably in the range of from several microns to several millimeters. The porosity of the porous supporting layer is preferably in the range of 10-80%.

The porous supporting layer operates to support the homogeneous or fine polymer layer. The size of pores on the surface is preferably in the range of 10-5,000 Å, more preferably in the range of 10-1,000 Å. The porous supporting layer preferably has an asymmetric structure to suppress the resistance when a gas permeates through the membrane.

The homogeneous or dense layer is preferably composed of a polymer having a oxygen permeation coefficient of not less than $1 \times 10^{-8}$ (cm$^3$·cm/cm$^2$·cmHg·sec). Such a polymer is selected from the group consisting of polyorganosiloxane, polyorganosiloxane/polycarbonate copolymer, polyorganosiloxane/polyphenylene copolymer, polyorganosiloxane/polystyrene copolymer and polytrimethylsililpropyne. Particularly, a cross-linked type polydimethylsiloxane is the most preferable from the viewpoints of mechanical strength and oxygen permeation coefficient. Although the thickness of the homogeneous or dense layer is preferably small from the viewpoint of gas permeation ability, a layer having too small a thickness is not desirable because pin holes are likely to occur. Advantageously, the thickness of the homogeneous or dense layer is preferably about 0.1 μm.

The kind of feed water spacer 4 also is not particularly restricted. However, feed water spacer 4 is preferably constructed of a net, particularly a plastic net, which causes a low pressure loss for the raw liquid supplied to the feed water spacer For example, a net having a thickness of 0.3-2.0 mm and whose material is polyethylene, nylon or polypropylene is suitable for the feed water spacer. The kind and shape of permeation side spacer 5 provided in envelope-like gas permeable membrane 3 also are not particularly restricted. However, permeation side spacer 5 is also preferably constructed of a net, particularly a plastic net. In particular, a polypropylene net having an appropriate rigidity and capable of causing a small pressure loss for the flow of the gas is suitable. Alternatively, polyester fabrics having grooves which extend in one direction can be used for the permeation side spacer as described later.

The material and shape of flow regulating wall 9 is not particularly restricted, and the flow regulating wall may be formed as one which enables the completion of the module and can regulate the flow of a gas in the envelope-like gas permeable membrane. For example, the flow regulating wall can be formed by applying an adhesive to a required portion and curing it, or by providing an elastic material shaped in the form of a sheet or a strip in the envelope-like gas permeable membrane and fixing or bonding it. The latter elastic material is selected from, for example, a silicone rubber, a foamed plastic sheet, a nitrile rubber or other elastic plastic sheets.

The material of partition block 7 also is not particularly restricted, and the material may be one which substantially can block the flow of a gas in the longitudinal direction of mandrel 2. For example, the material is selected from a hard vinyl chloride, an ABS resin, a nylon or a rubber. The partition block may be bonded to the inner surface of hollow mandrel 2 or not.

The above spiral wound gas permeable membrane module 1 shown in FIGS. 1-4 is used as follows.

Figure 1:
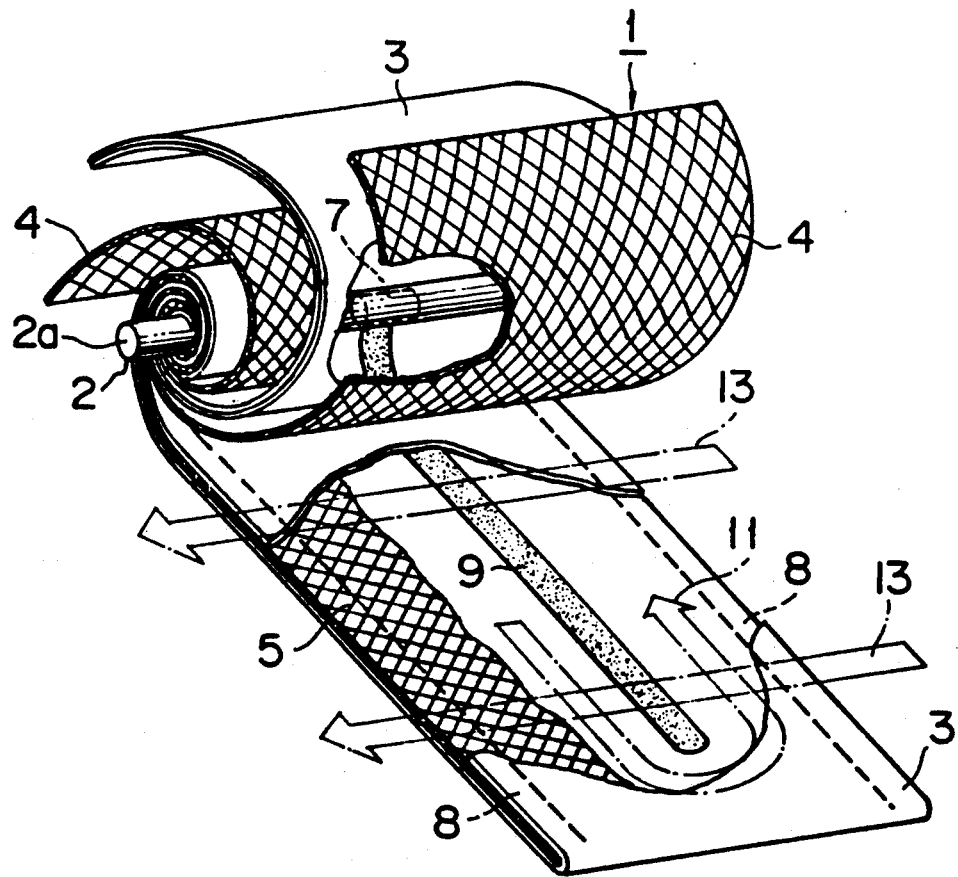
FIG. 1 is a perspective view of a spiral wound gas permeable membrane module at its unwound state according to an embodiment of the present invention.

A raw liquid 13 is introduced on the outer surfaces of the envelope-like gas permeable membrane 3 along the passageway of feed water spacer 4, for example, in the axial direction in parallel to hollow mandrel 2 as shown in FIG. 1. This raw liquid 13 contains a gas to be degasified. The raw liquid 13 is supplied from a liquid supply pump 31 provided as a liquid supplying means and connected to a housing 32 containing at least one spiral wound gas permeable membrane module 1 therein, as shown in FIG. 5. The type of raw liquid is not particularly restricted. Usually the raw liquid is city water, industrial water, a super pure water, a process water for food industry, etc. However, the raw liquid may be other aqueous solutions or a solution such as a chemical solution other than nonaqueous solutions.

On the other hand, a carrier gas 14 (FIG. 3) is introduced on the back surfaces of the envelope-like gas permeable membrane 3 along the passageway of the permeation side spacer 5. The carrier gas 14 is introduced into the inside of hollow mandrel 2 through end opening 2a. The carrier gas 14 is then directed into the interior of envelope-like gas permeable membrane 3 through holes 6 aligned on one side of the partition block 7. At that time, the carrier gas 14 does not flow directly towards the other end opening 2b, because partition block 7 blocks the flow of the carrier gas in mandrel. Thereafter, the carrier gas 14 flows in envelope-like gas permeable membrane 3 along the passageway defined by the permeation side spacer 5, in the spiral outer direction and then turning in the spiral inner direction while the flow is regulated by flow regulating or directing wall 9 as shown by arrows 10, 11 and 12 in FIG. 3. Then, the carrier gas 14 flows into the inside of hollow mandrel 2 through holes 6 aligned on the other side of the partition block 7, and flows out from the other end opening 2b. When the carrier gas flows out of the other end opening 2b, the gas becomes a gas stream 15 containing the carrier gas and a gas permeated from the raw liquid 13 through the envelope-like gas permeable membrane 3. This carrier gas 14 is supplied from a carrier gas source 33 connected to end opening 2a of the module 1 assembled in housing 32 as shown in FIG. 5. The carrier gas 14 flowing out from the module 1 is preferably drawn by a vacuum pump 34 connected to the other end opening 2b.

The carrier gas 14 is a gas basically different from the gas to be degasified from the raw liquid. The carrier gas 14 flowing in the envelope-like gas permeable membrane 3 purges the residual gas in the envelope-like gas permeable membrane and the gas permeated from the raw liquid 13 through the envelope-like gas permeable membrane. Therefore, the partial gas pressure of the gas to be degasified on the permeation side can be extremely reduced, for example, to be nearly equal to zero. As a result, the degasification ability of the module 1 is increased to a great extent.

The carrier gas 14 may be a gas which does not contain the gas to be degasified from the raw liquid, and can be selected depending upon certain factors. For example, in the case where oxygen contained in a raw water is degasified, nitrogen or carbon dioxide can be used as the carrier gas. In a case where carbon dioxide contained in a raw water is degasified together with oxygen, then nitrogen may be used as the carrier gas.

The flow rate of the carrier gas 14 can be determined by a target dissolved gas concentration of the raw liquid after the degasification by the module. For example, when nitrogen is used as the carrier gas, preferable the flow rate of the carrier gas is in the range of 5-10% of the flow rate of the raw water, by volume.

Figure 6:
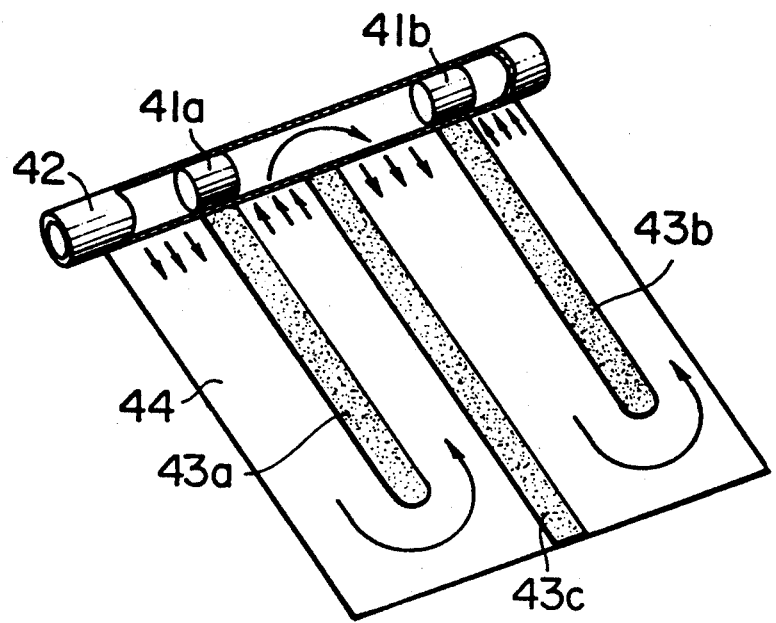
FIG. 6 is a perspective view of a part of a spiral wound gas permeable membrane module according to another embodiment of the present invention.

The flow regulating wall 9 can be formed in an appropriate length, number or location, depending upon the use of the module 1. For example, as shown in FIG. 6, two partition blocks 41a and 41b are provided in the hollow mandrel 42, and two flow regulating walls 43a and 43b, positioned to correspond to the positions of the respective partition blocks 41a and 41b and extending to an intermediate position in an envelope-like gas permeable membrane 44 and one flow regulating wall 43c positioned at the central position of the mandrel in its longitudinal direction and extending over the entire length from the outer surface of the mandrel to the spiral outer end in the envelope-like gas permeable membrane 44 are formed in the envelope-like gas permeable membrane. The carrier gas and the gas degasified from the raw liquid flow as shown by arrows in FIG. 6. In such a structure, more efficient degasification will be expected.

Figure 7A:
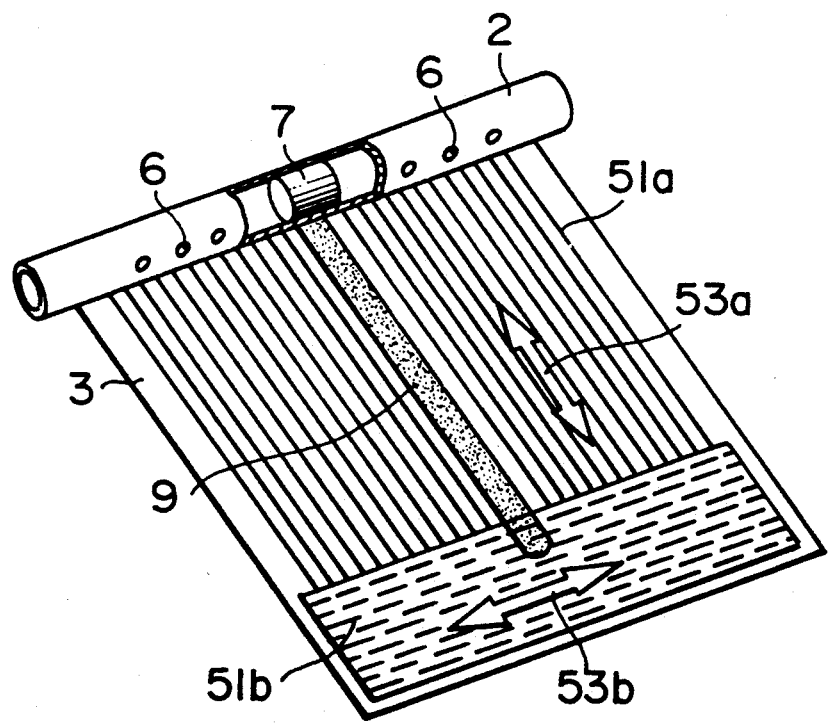
FIG. 7A is a perspective view of a part of a spiral wound gas permeable membrane module according to a further embodiment of the present invention.
Figure 7B:
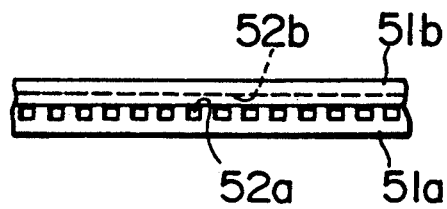
FIG. 7B is a partial sectional view of the permeation side spacer of the module shown in FIG. 7A.

The permeation side spacer 5 also can be modified to various materials and shapes. For example, as shown in FIGS. 7A and 7B, the permeation side spacer may be constructed by the combination of a tricot 51a having grooves 52a extending in one direction 53a and another tricot 51b having grooves 52b extending in the direction 53b substantially perpendicular to the direction 53a. The tricot 51a and tricot 51b are stacked such that their surfaces having the grooves 52a and 52b face each other. The gas flowing in the envelope-like gas permeable membrane 3 flows along the grooves 52a of tricot 51a from holes 6 aligned on one side relative to partition block 7 in the spiral outer direction, then flows along the grooves 52b of tricot 51b in the axial direction, and thereafter flows along the grooves 52a of tricot 51a towards holes 6 aligned on the other side relative to partition block 7 in the spiral inner direction. Any one of tricot 51a and tricot 51b may be provided in envelope-like gas permeable membrane 3, and only a part of them may be provided in the envelope-like gas permeable membrane.

Figure 8A:
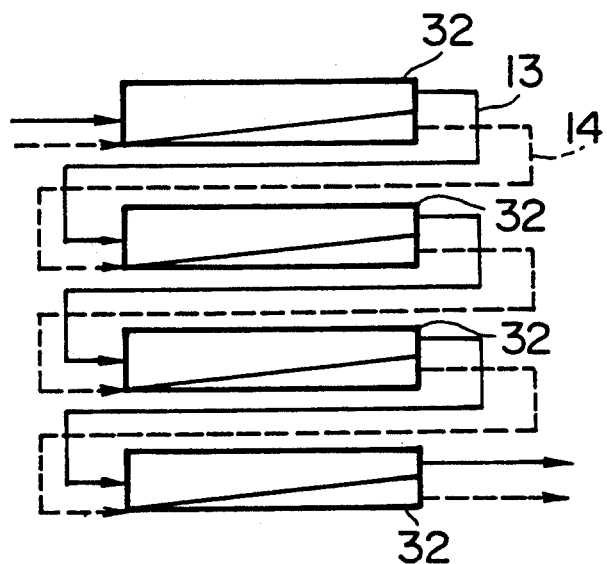
FIGS. 8A to 8D are block diagrams of apparatuses according to the present invention, showing variations of the connection of a plurality of spiral wound gas permeable membrane modules.
Figure 8B:
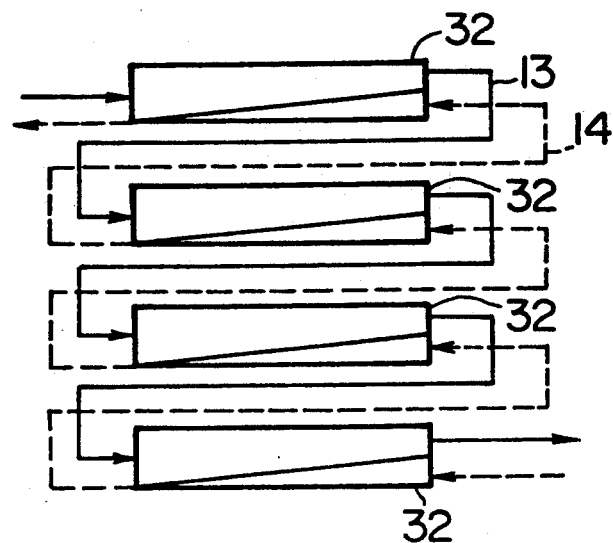
Figure 8C:
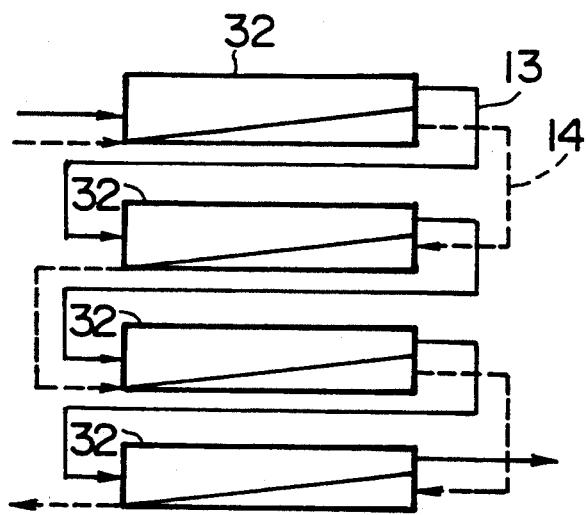
Figure 8D:
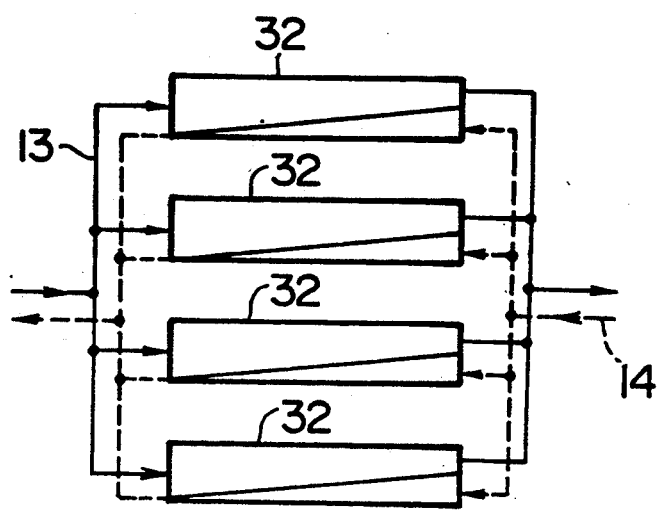

In the operation of the degasification by using spiral wound gas permeable membrane module 1, although a sufficiently large degasification ability can be achieved by a single spiral wound gas permeable membrane module 1 in comparison with a conventional module, the degasification ability can be increased by connecting a plurality of modules 1 together. Usually, one to six modules are contained in a housing 32. When the degasification ability is desired to be further increased, a plurality of housings 32 are connected in series as shown in FIGS. 8A–8C or in parallel as shown in FIG. 8D. In the case where the degree of degasification is desired to be increased, the connection in series is preferable. In the case where the capacity of degasification is desired to be increased, the connection in parallel is preferable. In the connection in series, since the carrier gas 14 flows through the plurality of housings 32 in order, it is expected that the concentration of the gas degasified from the raw liquid 13 in the carrier gas becomes gradually higher and the efficiency of the degasification gradually decreases. According to the investigation by the inventors of the present invention, however, it has been found that the efficiency of degasification can be easily controlled by the flow rate of the carrier gas even if the purity of the carrier gas is reduced to some extent accompanying with the flow through the plurality of housings 32 connected in series, and that the running cost can be greatly reduced as compared with the case where the carrier gas is supplied in parallel. In the connection in series, the carrier gas 14 may be supplied in the same manner and the same order as that of the raw liquid 13 as shown in FIG. 8A. Alternatively, the carrier gas 14 and the raw liquid 13 may be supplied in counter flow to each other as shown in FIG. 8B. Further, the carrier gas 14 may be supplied by any other path as shown in FIG. 8C. In particular, the counter flow supply such as one shown in FIG. 8B is preferable from the viewpoint of obtaining a high degasification efficiency because the raw liquid of the exit side is exposed to the carrier gas of entrance side having the highest purity.

The spiral wound gas permeable membrane module 1 according to the present invention can be used for charging a gas into a liquid.

Figure 9:
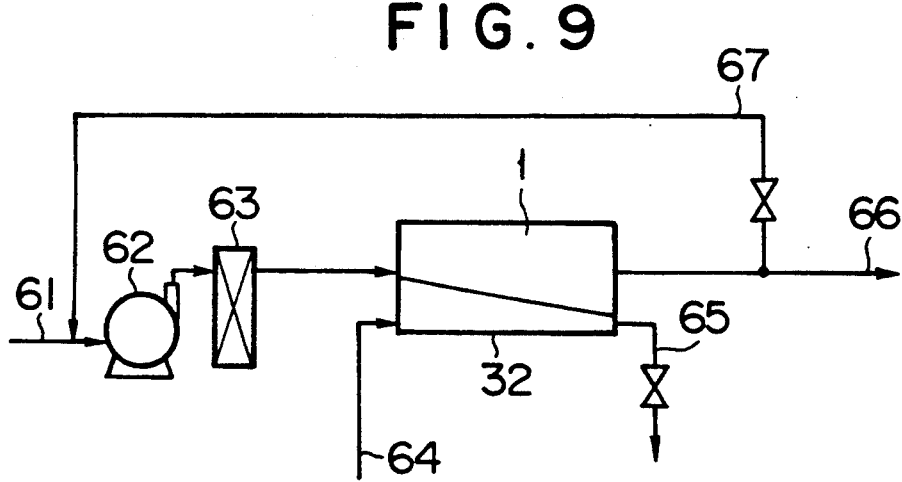
FIG. 9 is a block diagram of an apparatus using the spiral wound gas permeable membrane module shown in FIG. 1 for charging a gas into a liquid.
Figure 10:
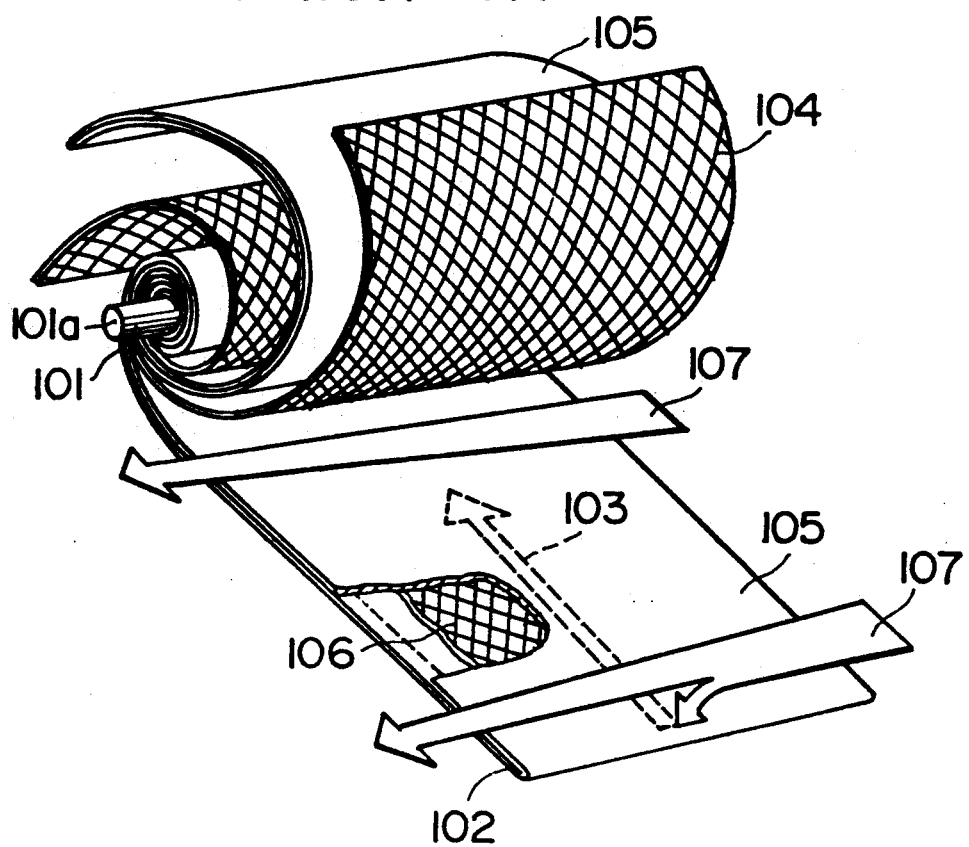
FIG. 10 is a perspective view of a conventional spiral wound gas permeable membrane module at its unwound state.

FIG. 9 illustrates a typical system for such a gas charging which uses a housing 32 containing a single or a plurality of spiral wound gas permeable membrane modules 1. A liquid 61 (for example, water) is supplied to the passageway of feed water spacer 4 of a spiral wound gas permeable membrane module 1 incorporated into housing 32, by a supply pump 62 through a filter 63. A gas 64 to be charged into the liquid 61 is supplied to the passageway of permeation side spacer 5 of the spiral wound gas permeable membrane module 1. A vent line 65 is connected to the exit side of mandrel 2. Preferably the pressure of the supplied gas 64 is maintained to a relatively high pressure. The gas 64 permeates through envelope-like gas permeable membrane 3 from the side of permeation side spacer 5 to the side of feed water spacer 4, and charged into the liquid 61. The liquid charged with gas 64 is delivered out from the housing 32 as a charged liquid 66. A part of the charged liquid 66 may be returned to the liquid supply line by a bypass line 67 in order to increase the degree of the charge. The gas to be charge is not particularly restricted. Oxygen and carbon dioxide are preferably used as the gas.

In such a gas charging, the gas 64 is charged into the liquid 61 via a broad area of the envelope-like gas permeable membrane 3 because the gas is introduced into the interior of the envelope-like membrane and the flow of the gas is regulated by flow regulating wall 9 over the broad area in the envelope-like membrane. Therefore, the efficiency of the gas charging is very high. Moreover, since the gas charging is performed by utilizing the equilibrium condition between the gas and the liquid, the gas is not charged over than the saturated state of the charged liquid. Accordingly, bubbles due to lack of dissolution of the gas into the liquid does not occur. Further, since the pressure loss of the supplied liquid between the entrance side and exit side of the housing 32 is relatively small, a uniform charging can be performed even if the pressure of the supplied liquid is small. Furthermore, the concentration of the gas in the charged liquid can be easily controlled to a desired value by adjusting the pressure of the supplied liquid, the gas pressure, the flow rate of the gas or the temperature of the liquid.

Next, the present invention will be explained in more detail by the following examples. However, the present invention is not limited by the examples.

EXAMPLE 1

A hydrophobic gas permeable membrane obtained by forming a silicone thin layer on a porous supporting layer composed of polyester taffeta/polysulfone was wrapped around a hollow mandrel composed of a hard vinyl chloride together with a permeation side spacer composed of a polypropylene net with a thickness of 0.3 mm and a feed water spacer composed of a polypropylene net with a thickness of 0.6 mm. A spiral wound gas permeable membrane module, wherein a flow regulating wall was formed from an adhesive in the central portion of the envelope-like gas permeable membrane as shown in FIG. 3, the total membrane area of which was 8 m$^2$ and into which five sets of the envelope-like gas permeable membranes were incorporated, was made. After a partition block composed of a hard vinyl chloride was inserted into the hollow mandrel at the longitudinally central position and bonded to the inner surface of the mandrel, the module was contained in a housing. The degasification ability of the module was determined by supplying nitrogen as a carrier gas. The flow rate of a raw water was 1,000 l/h, the degree of vacuum of the permeation side was controlled to 85 Torr, the flow rate of nitrogen was 1,000 cc/min, and the operation temperature was 25° C. As a result, the initial degree of concentration of the dissolved oxygen of 8.0 ppm in the raw water was reduced to 1.9 ppm. Next, the degasified raw water in the above manner (the degree of concentration of the dissolved oxygen: 1.9 ppm) was again degasified in the same manner. As a result, the degree of concentration of the dissolved oxygen was reduced to 0.5 ppm.

COMPARATIVE EXAMPLE 1

The same parts as those of Example 1 other than no flow regulating wall were used to make a spiral wound gas permeable membrane module. The degasification ability of the module was determined after incorporating the module into a housing without providing a partition block in the hollow mandrel and without supplying a carrier gas. The flow rate of a raw water was 1,000 l/h, the degree of vacuum of the permeation side was controlled to 85 Torr, and the operation temperature was 25° C. As a result, the initial degree of concentration of the dissolved oxygen of 8.0 ppm in the raw water was reduced to 2.7 ppm. Next, nitrogen was supplied to the module as a carrier gas at 1,000 cc/min by flow rate, under the same conditions. As a result, the degree of concentration of the dissolved oxygen was reduced to 2.5 ppm. Next, the degasified raw water (the degree of concentration of the dissolved oxygen: 1.4 ppm) was again degasified in the same manner as described above without supplying nitrogen. As a result, the degree of concentration of the dissolved oxygen was reduced only to 1.2 ppm.

EXAMPLE 2

Four spiral wound gas permeable membrane modules having the same structure as that of Example 1, which had the flow regulating wall and the partition block, were made. Each module was incorporated into each of four housings. The four housings were connected in series in the manner shown in FIG. 8C to make a degasification apparatus. The degasification ability of the module was determined by supplying nitrogen as a carrier gas. The flow rate of a raw water was 1,000 l/h, the degree of vacuum of the permeation side was controlled to 85 Torr, the flow rate of nitrogen was 1,500 cc/min, and the operation temperature was 25° C. As a result, the initial degree of concentration of the dissolved oxygen of 8.0 ppm in the raw water was reduced to 0.2 ppm.

EXAMPLE 3

Two spiral wound gas permeable membrane modules having the same structure as that of Example 1 were made, and the modules were incorporated into a single housing. An apparatus having the system shown in FIG. 9 was made using this housing. A super pure water with a temperature of 2° C. was supplied to the apparatus at a flow rate of 0.75 ton/h. At the same time, carbon dioxide was supplied into the envelope-like gas permeable membranes of the module at a pressure of 1.5 $kg/cm^2$. In this condition, the concentration of carbon dioxide dissolved in the water of exit side was determined. As a result, the concentration of carbon dioxide determined was 0.40 wt %. Where, bypass line 67 was closed.

EXAMPLE 4

The same spiral wound gas permeable membrane modules were used and the same apparatus was made as those of Example 3. An examination water with a dissolved oxygen concentration of 1.2 ppm and a temperature of 25° C., from which SS component was removed by SU-610RO module produced by Toray Industries, inc., was supplied to the apparatus. Pure oxygen was supplied from a oxygen bomb to the apparatus as a gas to be charged into the water at a pressure of 2.0 $kg/cm^2$. As a result, the concentration of the oxygen dissolved in the treated water was 8.2 ppm. Thus, the effect due to the gas charging was significantly recognized.

Although several preferred embodiments of the present invention have been described herein in detail, it will be appreciated by those skilled in the art that various modifications and alterations can be made to these embodiments without materially departing from the novel teachings and advantages of this invention. Accordingly, it is to be understood that all such modifications and alterations are included within the scope of the invention as defined by the following claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A spirally wound gas permeable membrane module comprising
   a hollow mandrel provided with a plurality of longitudinally aligned holes,
   at least one envelope-like gas permeable membrane connected to the side surface of said mandrel at the open end of said envelope-like gas permeable membrane to provide communication between the interior of said mandrel and the interior of said envelope-like gas permeable membrane through said holes, said membrane being spirally wrapped around said mandrel,
   at least one feed water spacer spirally wrapped around said mandrel so that it is positioned on the outer surfaces of said spirally wrapped envelope-like gas permeable membrane,
   at least one permeation side spacer provided in said envelope-like gas permeable membrane, said permeation side spacer being a combination of a tricot having grooves extending in one direction and another tricot having grooves extending in the opposite direction,
   means provided in said mandrel for substantially blocking the flow of a gas flowing in said mandrel in its longitudinal direction; and
   means provided in said envelope-like gas permeable membrane for directing the flow of gas introduced into said envelope-like gas permeable membrane through said holes aligned on one side of said flow blocking means so that the gas travels in said envelope-like gas permeable membrane in a spirally outer direction and then returns in a spirally inner direction where it flows back into said mandrel through said holes aligned on the other side of said flow blocking means.

2. The module according to claim 1, wherein said flow directing means is formed by applying an adhesive strip within said envelope-like gas permeable membrane and curing the adhesive.

3. The module according to claim 1, wherein said flow directing means is an elastic polymer provided in said envelope-like gas permeable membrane for directing the flow of said gas introduced thereinto.

4. The module according to claim 1, wherein said gas permeable membrane is constructed of a polymer membrane having gas permeability.

5. The module according to claim 4, wherein said polymer membrane is made of a polymer selected from the group consisting of a silicone-based polymer, a fluorine-containing polymer and polyolefine-based polymers.

6. The module according to claim 1, wherein said flow blocking means is made of a material selected from the group consisting of hard vinyl chloride, an ABS resin, nylon and a rubber.

7. The module according to claim 1, wherein said feed water spacer is a net.

8. A degasification apparatus including at least one spirally wound gas permeable membrane module having a hollow mandrel provided with a plurality of longitudinally aligned holes, at least one envelope-like gas permeable membrane connected to the side surface of said mandrel at the open end of said envelope-like gas permeable membrane to provide communication between the interior of said mandrel and the interior of said envelope-like gas permeable membrane through said holes, said membrane being spirally wrapped around said mandrel, at least one feed water spacer spirally wrapped around said mandrel so that it is positioned on the outer surfaces of said spirally wrapped envelope-like gas permeable membrane and defines passageways therebetween, at least one permeation side spacer provided in said envelope-like gas permeable membrane, said permeation side spacer being a combination of a tricot having grooves extending in one direction and another tricot having grooves extending in the opposite direction, said apparatus comprising:

means for supplying a raw liquid to the passageways of said feed water spacer;

means for supplying a carrier gas to one of the open ends of said mandrel;

means provided in said mandrel for substantially blocking the flow of said carrier gas flowing in said mandrel in its longitudinal direction at a predetermined position; and means provided in said envelope-like gas permeable membrane for directing the flow of said carrier gas introduced into said envelope-like gas permeable membrane through said holes aligned on one side of said flow blocking means so that the gas travels in said envelope-like gas permeable membrane in a spirally outer direction and then returns in a spirally inner direction where it flows back into said mandrel through said holes aligned on the other side of said flow blocking means.

9. The apparatus according to claim 8 further comprising means for drawing said carrier gas from the interior of said envelope-like gas permeable membrane through said other side holes and inside said mandrel to reduce the gas pressure in said envelope-like gas permeable membrane.

10. The apparatus according to claim 8 comprising a plurality of said spirally wound gas permeable membrane modules connected in series.

11. The apparatus according to claim 8 comprising a plurality of said spirally wound gas permeable membrane modules connected in parallel.

12. An apparatus for charging a gas into a liquid including at least one spirally wound gas permeable membrane module having a hollow mandrel provided with a plurality of longitudinally aligned holes, at least one envelope-like gas permeable membrane connected to the side surface of said mandrel at the open end of said envelope-like gas permeable membrane to provide communication between the interior of said mandrel and the interior of said envelope-like gas permeable membrane through said holes, said membrane being spirally wrapped around said mandrel, at least one feed water spacer spirally wrapped around said mandrel so that it is positioned on the outer surfaces of said spirally wrapped envelope-like gas permeable membrane and defines passageways therebetween, at least one permeation side spacer provided in said envelope-like gas permeable membrane, said permeation side spacer being a combination of a tricot having grooves extending in one direction and another tricot having grooves extending in the opposite direction, said apparatus comprising:

means for supplying a raw liquid to the passageways of said feed water spacer;

means for supplying a carrier gas to one of the open ends of said mandrel;

means provided in said mandrel at a predetermined position for substantially blocking the flow of said gas flowing in said mandrel in its longitudinal direction; and means provided in said envelope-like gas permeable membrane for directing the flow of said gas introduced into said envelope-like gas permeable membrane through said holes aligned on one side of said flow blocking means so that the gas travels in said envelope-like gas permeable membrane in a spirally outer direction and then returns in a spirally inner direction where it flows back into said mandrel through said holes aligned on the other side of said flow blocking means.

13. The apparatus according to claim 12 comprising a plurality of said spirally wound gas permeable membrane modules connected in series.

14. The apparatus according to claim 12 comprising a plurality of said spirally wound gas permeable membrane modules connected in parallel.

15. A method for removing a gas from a liquid using at least one spiral wound gas permeable membrane module having a hollow mandrel with a plurality of longitudinally aligned holes, at least one envelope-like gas permeable membrane connected to the side surface of said mandrel at the open end of said envelope-like gas permeable membrane to provide communication between the interior of said mandrel and the interior of said envelope-like gas permeable membrane through said holes, said membrane being spirally wrapped around said mandrel, at least one feed water spacer spirally wrapped around said mandrel so that it is positioned on the outer surfaces of said spirally wrapped envelope-like gas permeable membrane and defines passageways therebetween, at least one permeation side spacer provided in said envelope-like gas permeable membrane, said permeation side spacer being a combination of a tricot having grooves extending in one direction and another tricot having grooves extending in the opposite direction, means provided in said mandrel at a predetermined position for substantially blocking the flow of a gas flowing in said mandrel in its longitudinal direction, and means provided in said envelope-like gas permeable membrane for directing the flow of said gas introduced into said envelope-like gas permeable membrane through said holes aligned on one side of said flow blocking means so that the gas travels in said envelope-like gas permeable membrane in a spirally outer direction and then returns in a spirally inner direction where it flows back into said mandrel through said holes aligned on the other side of said flow blocking means, said method comprising the steps of:

supplying a raw liquid containing the gas to be removed therefrom to the passageway of said feed water spacer so that the raw liquid flows along the outer surfaces of said spirally wrapped envelope-like gas permeable membrane; and supplying a carrier gas, substantially other than the gas to be degasified from said raw liquid, to one of the open ends of said mandrel so that the carrier gas flows from said one open end to the other open end of said mandrel through the interior of said envelope-like gas permeable membrane and said holes aligned on both sides of said flow blocking means.

16. The method according to claim 15 further comprising the step of drawing said carrier gas from the interior of said envelope-like gas permeable membrane through said other side holes and the inside of said mandrel to reduce the gas pressure in said envelope-like gas permeable membrane.

17. The method according to claim 15, wherein said raw liquid and said carrier gas are supplied to a plurality of said spirally wound gas permeable membrane modules in series.

18. The method according to claim 15, wherein said raw liquid and said carrier gas are supplied to a plurality of said spirally wound gas permeable membrane modules in parallel.

19. The method according to claim 17 or 18, wherein said raw liquid and said carrier gas are supplied in counter flow to each other.

20. A method for changing a gas into a liquid using at least one spiral wound gas permeable membrane module having a hollow mandrel with a plurality of longitudinally aligned holes, at least one envelope-like gas permeable membrane connected to the side surface of said mandrel at the open end of said envelope-like gas permeable membrane to provide communication between the interior of said mandrel and the interior of said envelope-like gas permeable membrane through said holes, said membrane being spirally wrapped around said mandrel, at least one feed water spacer spirally wrapped around said mandrel so that it is positioned on the outer surfaces of said spirally wrapped envelope-like gas permeable membrane and defines passageways therebetween, at least one permeation side spacer provided in said envelope-like gas permeable membrane, said permeation side spacer being a combination of a tricot having grooves extending in one direction and another tricot having grooves extending in the opposite direction, means provided in said mandrel at a predetermined position for substantially blocking the flow of a gas flowing in said mandrel in its longitudinal direction, and means provided in said envelope-like gas permeable membrane for directing the flow of said gas introduced into said envelope-like gas permeable membrane through said holes aligned on one side of said flow blocking means so that the gas travels in said envelope-like gas permeable membrane in a spirally outer direction and then returns in a spirally inner direction where it flows back into said mandrel through said holes aligned on the other side of said flow blocking means, said method comprising the steps of:

supplying a liquid to the passageway of said feed water spacer so that the liquid flows on and along the outer surfaces of said spirally wrapped envelope-like gas permeable membrane; and supplying the gas to be charged into said liquid to one of the open ends of said mandrel so that the gas flows from said one open end to the other open end of said mandrel through the interior of said envelope-like gas permeable membrane and said holes aligned on both sides of said flow blocking means.

21. The method according to claim 20, wherein said liquid and said gas to be charged are supplied to a plurality of said spirally wound gas permeable membrane modules in series.

22. The method according to claim 20, wherein said liquid and said gas to be charged are supplied to a plurality of said spirally wound gas permeable membrane modules in parallel.

23. The method according to claim 21 or 22, wherein said liquid and said gas to be charged are supplied in counter flow to each other.

* * * * *